No. 882,191. PATENTED MAR. 17, 1908.
J. FINN.
SELF REGISTERING LAND MEASURING DEVICE.
APPLICATION FILED MAY 21, 1907.
2 SHEETS—SHEET 2.
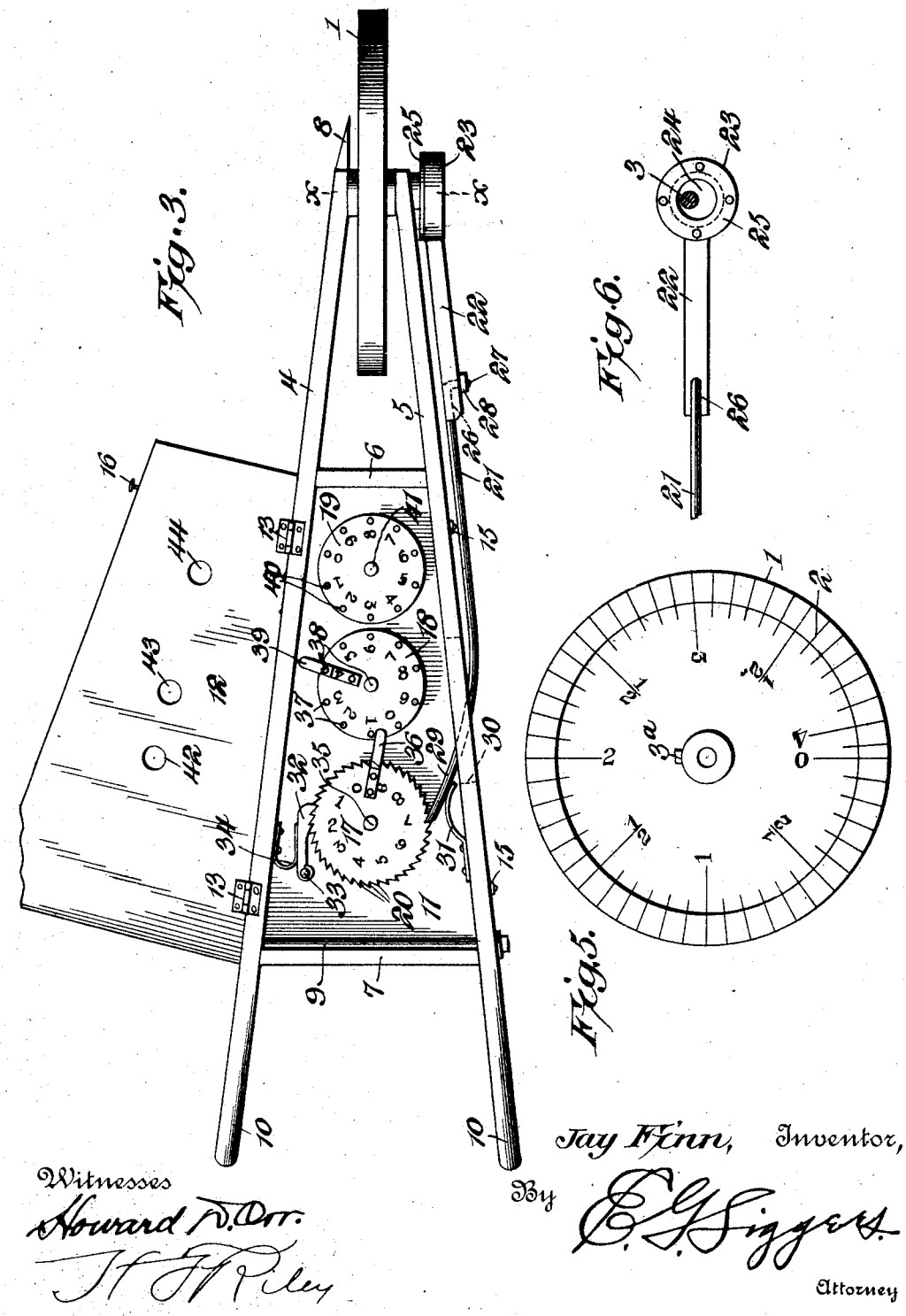
Witnesses
Howard N. Orr.
J. F. Riley
Jay Finn, Inventor,
By E. G. Siggers
Attorney

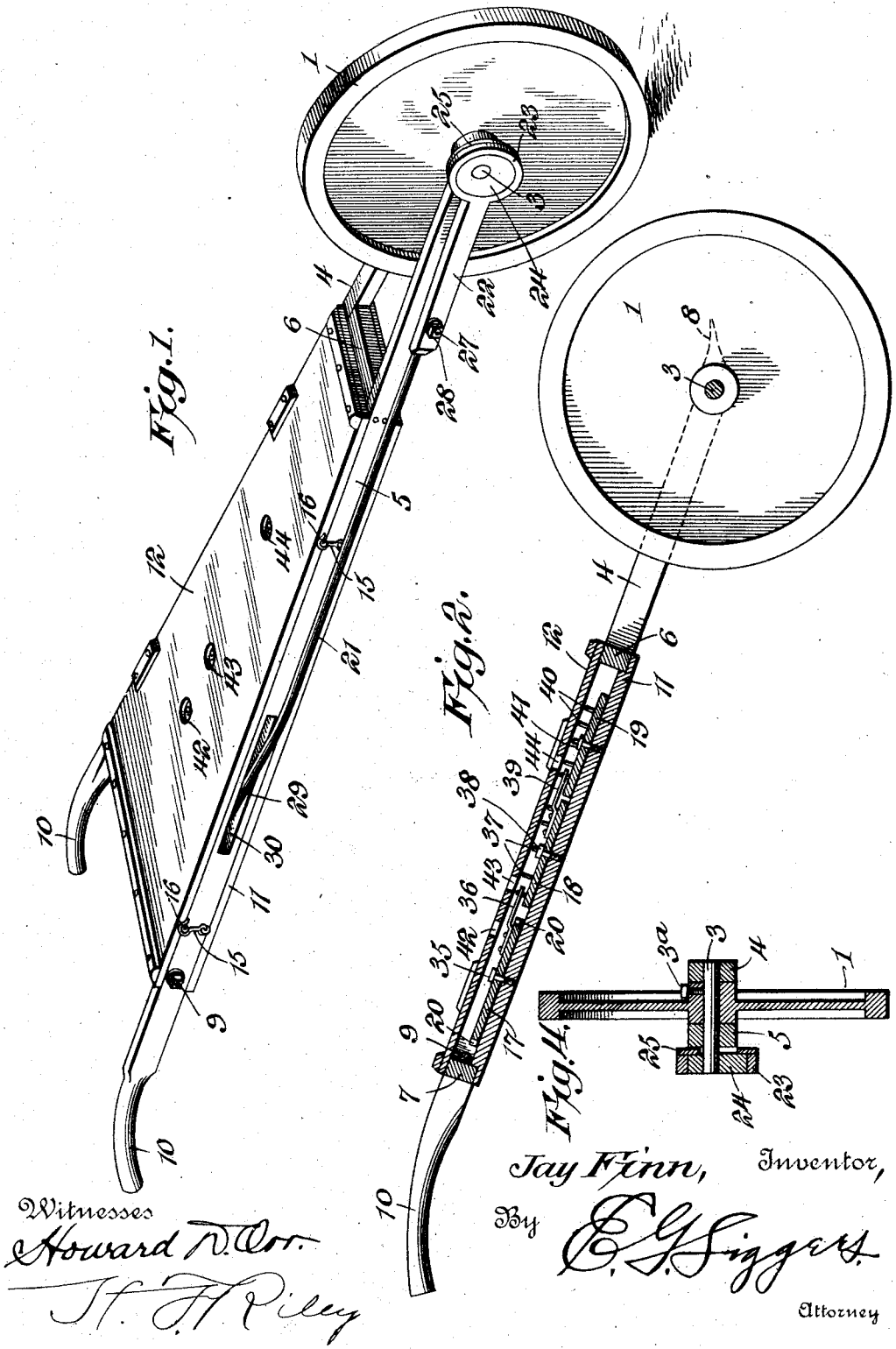

UNITED STATES PATENT OFFICE.

JAY FINN, OF ELMO, KANSAS.

SELF-REGISTERING LAND-MEASURING DEVICE.

No. 882,191.      Specification of Letters Patent.      Patented March 17, 1908.

Application filed May 21, 1907. Serial No. 374,870.

*To all whom it may concern:*

Be it known that I, JAY FINN, a citizen of the United States, residing at Elmo, in the county of Dickinson and State of Kansas, have invented a new and useful Self-Registering Land-Measuring Device, of which the following is a specification.

The invention relates to a self registering land measuring device.

The object of the present invention is to improve the construction of measuring devices, and to provide a simple and comparatively inexpensive measuring device, capable of accurately measuring land and of automatically recording the distance traveled by it.

A further object of the invention is to provide a land measuring device, which will enable lands of any character to be quickly and easily measured, without requiring the operator to assume a stooping position while the device is traveling over the ground.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a land measuring device, constructed in accordance with this invention. Fig. 2 is a longitudinal sectional view of the same partly in elevation. Fig. 3 is a plan view, the lid or cover being open to illustrate the registering and calculating mechanism. Fig. 4 is a transverse sectional view on the line *x—x* of Fig. 3. Fig. 5 is an elevation of the measuring wheel, showing the graduations thereof. Fig. 6 is a detail view, illustrating the construction of the eccentric and the actuating rod or pitman.

Like numerals of reference designate corresponding parts in all the figures of the drawings.

1 designates a measuring wheel, adapted to run on the ground for measuring lands, and provided with a periphery of $49\frac{1}{2}$ inches, or one fourth of a rod. One of the faces of the measuring wheel is provided with graduations 2, the wheel being marked off into feet and inches, as clearly illustrated in Fig. 5 of the drawings, so that, as hereinafter more fully explained, the result may be read in rods, feet and inches.

The measuring wheel is mounted on a transverse shaft or axle 3, which is journaled in suitable bearings of the front ends of a pair of longitudinal side bars 4 and 5 of the frame of the measuring device. The measuring wheel may be fixed to the shaft or axle by means of a set screw $3^a$, or any other suitable fastening means. The side bars 4 and 5, which converge forwardly, are connected by front and rear transverse bars 6 and 7, and the side bar 4 is provided at its front end with a forwardly projecting extension 8, which is tapered to form a pointer or indicator to coöperate with the graduations of the measuring wheel. The transverse bars 6 and 7 are located in advance and in rear of the center of the frame, and the side bars, which are also connected by a transverse rod 9, extend rearwardly beyond the transverse bar 7, and their rear portions 10 are curved slightly and are shaped into handles, which are adapted to be grasped by the operator, whereby the device may be run along the ground in the manner of a wheel-barrow with the operator in an erect position.

The frame is provided with a fixed bottom board 11, extending from the front to the rear transverse bar and entirely across the frame and secured to the side bars and to the transverse bars 6 and 7. The frame also carries a lid or cover 12, connected at one edge by hinges 13 with the side bar 4, and secured, when closed, by hooks 15, mounted on the other side bar 5. The hooks engage suitable headed projections 16, extending from the free edge of the lid or cover. The bottom board and the lid or cover form a casing for the calculating mechanism, which registers the distance traveled by the measuring device.

The calculating mechanism comprises a units disk or wheel 17, a tens disk or wheel 18 and a hundreds disk or wheel 19. The units disk or wheel is provided with peripheral teeth 20, and it bears numerals from "0" to "9," four teeth being provided between each of the numerals, so that four complete revolutions of the measuring wheel will move the units disk or wheel the distance of four teeth, or from one numeral to another.

The units disk is actuated by a rod or pitman 21, connected at its front ends with a shank 22 of a collar 23 of an eccentric 24, consisting of a disk mounted on the shaft or axle 3 at one end thereof. The collar is retained on the eccentric by means of a plate or disk 25, secured to the inner face of the collar and engaging the inner face of the eccentric 24. The shank 22 is provided at its rear end with a groove 26, located at the inner face of the shank or bar and receiving the front end of the rod or pitman 21, which has its front terminal 27 bent at an angle and extending through the shank or bar 22. The end 27 of the rod 21 is threaded for the reception of a nut 28, which engages the outer face of the shank or bar 22. The actuating element or pitman may, however, be constructed in any other preferred manner, as will be readily understood. The rear portions 29 of the pitman or actuating member extends through a slot 30 of the side bar 5 of the frame, and it is held in engagement with the teeth of the units disk or wheel by means of a suitable spring 31, secured at one end to the side bar 5 and having its other end bearing against the outer side of the pitman or actuating member.

The eccentric reciprocates the actuating member a distance equal to one of the teeth of the units disk, and a step by step movement is imparted to the disk by the rotary movement of the measuring wheel. The disk is held against retrograde movement by means of a check pawl or dog 32, pivoted at one end to the bottom 11 by a suitable fastening device 33 and provided at its other end with a plurality of teeth for engaging the teeth of the units disk or wheel. The pawl or dog 32 is maintained in engagement with the teeth of the units disk by means of a spring 34 secured to the inner edge of the side bar 4, and interposed between the same and the pawl or dog.

The units disk is mounted on a suitable shaft or spindle 35, and it carries an arm 36, adapted to engage successively a series of projections 37 of the tens disk or wheel 18, which also bears a set of numerals from "0" to "9". At each revolution of the units disk, the tens disk is moved the distance of one numeral. The tens disk is mounted on a suitable shaft or spindle 38, and it carries an arm 39, adapted to engage successively a series of projections 40 of the hundreds disk or wheel. The hundreds disk or wheel is mounted on a suitable shaft or spindle 41 and is provided with a set of numerals, ranging from "0" to "9," and it is actuated the distance of one numeral at each revolution of the tens disk or wheel. The cover 12 of the casing is provided with apertures 42, 43, and 44, arranged to expose a numeral of each of the disks or wheels of the calculating mechanism, whereby the distance in rods, traveled by the measuring device, may be seen at a glance. This, with the distance in feet and inches indicated by the hand or pointer 8, will denote the exact distance traveled by the measuring wheel.

Having thus fully described my invention, what I claim as new and desire to secure by Letters Patent, is:—

A land measuring device comprising a measuring wheel, a frame provided with forwardly converging side bars having the measuring wheel mounted between their front ends, the rear ends of the side bars forming handles, said frame being also provided at an intermediate point with a casing having a fixed bottom, and a movable top or cover provided with apertures, calculating mechanism arranged within the casing, an eccentric mounted upon the shaft, and an actuating member or pitman operated by the eccentric and actuating the calculating mechanism.

In testimony, that I claim the foregoing as my own, I have hereto affixed my signature in the presence of two witnesses.

JAY FINN.

Witnesses:
  A. S. PERCY,
  C. HARTMANN.